United States Patent Office 3,550,031
Patented Dec. 22, 1970

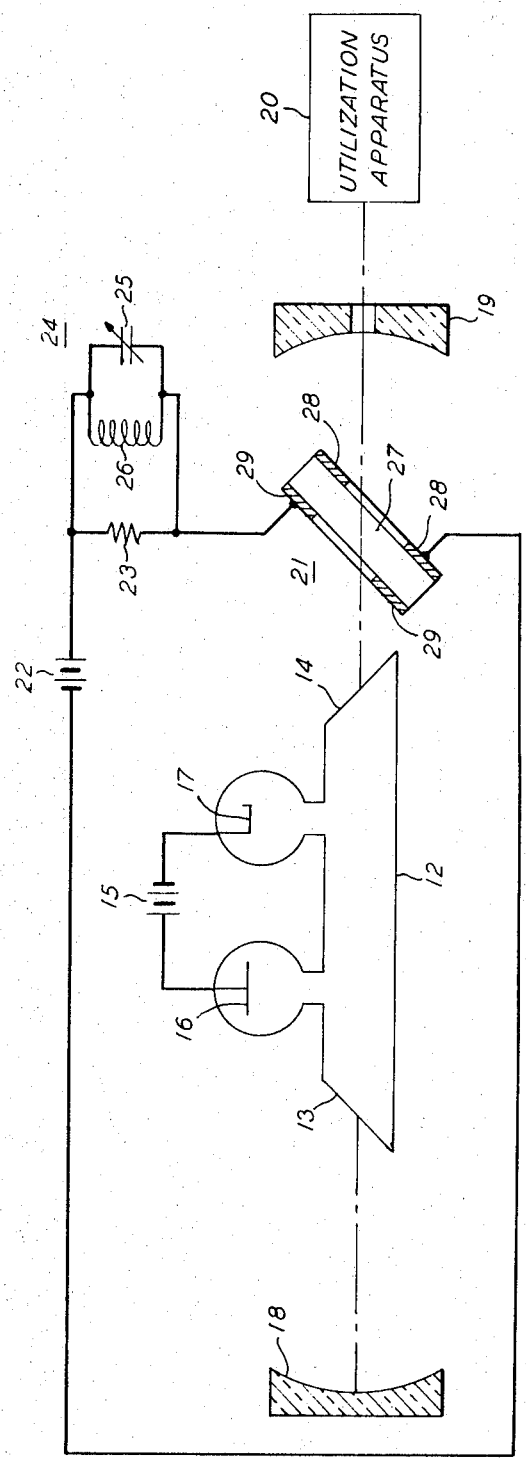

3,550,031
AMPLITUDE AND PHASE-LOCKING OF LASER TRANSITIONS BY PLASMA OSCILLATIONS

Solomon J. Buchsbaum, Westfield, N.J., assignor to Bell Telephone Laboratories, Incorporated, Murray Hill, N.J., a corporation of New York
Filed Aug. 21, 1967, Ser. No. 662,153
Int. Cl. H01s 3/00
U.S. Cl. 331—94.5                                    2 Claims

ABSTRACT OF THE DISCLOSURE

A molecular laser having multiple transitions spaced substantially equally in frequency can produce a series of output pulses when the multiple transitions are amplitude and phase-locked by an intra-resonator electro-optic effect of a bulk-effect oscillator such as the Gunn oscillator or the related limited-space-charge-accumulation device. For a carbon dioxide laser operating upon several transitions having wavelengths near 10.6 microns, a suitable bulk-effect oscillator employs a sample of gallium arsenide coupled to an external direct-current voltage source and adjustable resonant tank circuit and oriented to produce phase modulation of the resonated light.

BACKGROUND OF THE INVENTION

This invention relates to the amplitude and phase-locking of multiple laser transitions by means of oscillations in the bulk of a semiconductor placed within the optical resonator.

It is now well known in the laser art that multiple longitudinal modes of a single lasing transition of a laser can be amplitude and/or phase-locked by means of a suitable modulation having a frequency substantially equal to the mode spacing frequency. The amplitude and phase-locking will typically produce a train of light pulses, which are found to be more useful for some purposes, such as communication, than multiple modes of different frequencies and random phases would be. Multiple longitudinal modes are all emissions of a single stimulated transition between a pair of energy levels in the active medium. The different wavelengths or frequencies are all within the Doppler-broadened line-width, which is determined by random thermal motion of particles of the active medium. The mode spacing frequency is inversely dependent upon the path length in the optical resonator.

The amplitudes of the multiple modes are said to be locked when there persists a substantially constant relationship of the peak amplitudes. The phases of the multiple modes are said to be locked when there persists a predictable phase relationship between them. Amplitude-locking and phase-locking usually occur together and will hereinafter be designated amplitude and phase-locking.

The types of modulation used to achieve the amplitude and phase-locking include both lossy modulation and non-lossy, or reactive, modulation at the mode spacing frequency.

It is difficult to apply these techniques to a molecular laser which emits in the infrared because the Doppler-width is rather narrow. For example, in the 10.6 micron carbon dioxide laser, it is only about 50 megahertz. The resulting pulses would be relatively broad in time, unless more than two transitions having approximately equal frequency spacings were involved.

In the concurrently filed patent application of C. K. N. Patel, Ser. No. 662,152, Pat. No. 3,493,894 and assigned to the assignee hereof, there is disclosed apparatus for amplitude and phase-locking the relatively numerous different transitions of molecular lasers, such as the carbon dioxide laser operating near 10.6 microns, that operate upon transitions between rotational energy levels of different vibrational energy levels. More than two such transitions are typically spaced in frequency by substantially equal amounts. Moreover, the apparatus disclosed by Patel requires no externally supplied modulating signal and is driven entirely by the transitions themselves. The effect employed is a parametric effect in a device employing the bulk effect of a plasma of charge carriers in the nonparabolic conduction band of a suitable material.

Although the requirement of no externally applied signal is convenient in many respects, less attenuation of the coherent radiations in the laser might be achieved if most of the modulating power could be supplied from outside the laser.

SUMMARY OF THE INVENTION

According to my invention, direct-current power can be supplied to drive the modulating interaction in a bulk-effect device such as the Gunn-effect device, limited-space-accumulation device, or the IMPATT (semiconductive avalanche) device. The device is adapted to produce oscillations of the electric field in the path of the coherent radiation in response to the direct-current power; and the resulting large internal electric fields associated with moving domains or plasma waves will produce an electro-optic phase modulation of the resonated radiations from the different transitions sufficient to yield the amplitude and phase locking. A bulk-effect device is a device capable of providing a negative resistance that depends upon a property oft he bulk of its material.

According to one feature of my invention, the relatively high modulation frequencies required to amplitude and phase-lock multiple transitions, as contrasted to multiple modes, are readily provided by a bulk-effect device such as a Gunn oscillator or limited-space-charge-accumulation device, the active region of which is disposed in the optical resonator in the path of the coherent radiations in an orientation producing phase modulation of the light, which traverses the device from electrode to electrode.

The limited-space-charge-accumulation device is a solid-state bulk-effect oscillator powered by a direct-current voltage applied directly to a sample of two-valley material such as gallium arsenide. The sample is coupled to an external resonant circuit and adapted so that electric fields in the material oscillate between the positive resistance and negative resistance regions of the sample. Space charge accumulations associated with a high-field domain, as produced by a Gunn oscillator, do not have time to form; but the effect of the negative resistance regions yields a net gain. The frequency of operation can be made substantially independent of the length of the sample. This property is very useful for purposes of the present invention. Further details of the limited-space-charge-accumulation device (LSA device) and an explanation of "two-valley" properties of suitable materials may be found in the copending patent application of J. A. Copeland III, Ser. No. 564,081, filed July 11, 1966, now in interference, and assigned to the assignee hereof.

BRIEF DESCRIPTION OF THE DRAWING

Further features and advantages of my invention may be obtained from the following detailed description, taken together with the drawing, in which the sole figure is a partially pictorial and partially schematic showing of a preferred embodiment of my invention.

DESCRIPTION OF ILLUSTRATIVE EMBODIMENT

In the drawing, there is shown an arrangement for amplitude and phase-locking a gas laser of the type that typically lases on several transitions simultaneously. The laser includes a tube 12 containing a gaseous mixture of helium and carbon dioxide in proportions of about 10:1, respectively. The tube 12 has Brewster-angle and windows 13 and 14; and disposed therein and offset from the axis of the tube are the anode 16, which is connected to the positive terminal of source 15, and the cathode 17, which is connected to the negative terminal of source 15. The laser also includes the focusing reflectors 18 and 19, which form an optical resonator. The reflector 19 illustratively has a central aperture or is made to be partially transmitting to permit the extraction of a portion of the coherent radiation for use in a utilization apparatus 20.

For operation upon the multiple transitions between rotational energy levels of different vibrational levels of the carbon dioxide molecule, the reflectors 18 and 19 are illustratively coated with vacuum-deposited gold or another metal having sufficiently high reflectivity in a band of wavelengths around 10.6 microns. This band includes the wavelengths of the multiple lasing transitions that are of interest for the present invention. The corresponding frequencies are separated or spaced from the nearest others by approximately 56 gigahertz (56 kilomegacycles per second).

Internal to the laser there is shown a device adapted to provide amplitude and phase-locking according to the present invention. The bulk-effect device comprises a bulk-effect diode 21, a direct-current voltage source 22, a load 23 connected serially with diode 21 and source 22 and a resonant tank circuit 24 which symbolically includes a capacitance 25 and an inductance 26 connected in parallel with the load 23. The diode 21 comprises a sample 27 of bulk-effect semiconductive material included between a substantially ohmic cathode contact 28 and an anode contact 29. The bulk-effect diode 21 can be of n-type gallium arsenide of substantially uniform consistency and doped in a manner known in the art to give a negative resistance characteristic. The following discussion assumes that n-type material, in which operation depends primarily on electron current responses to applied voltages, is used although it is to be understood that p-type material could alternatively be used to the extent known in the art. Further, the circuit elements shown are intended to be only schematic representations; known microwave components are preferably used to perform the functions indicated. Also, a suitable microwave arrangement is shown in FIG. 3 of J. A. Copeland's copending application, Ser. No. 612,598, filed Jan. 30, 1967, and assigned to the assignee hereof. The microwave components would include suitable Brewster-angle entrance and exit windows for the light beam, as necessary.

The utilization apparatus 20 is illustratively an optical modulator or parametric frequency shifter, such as might typically be required in a communication system employing the illustrated laser.

Optional details and modifications of carbon dioxide lasers, useful with the present invention, may be found in the copending patent application of C. K. N. Patel, Ser. No. 495,844, filed Oct. 14, 1965, now abandoned in favor of continuation-in-part application, Ser. No. 814,510, filed Mar. 28, 1969, and assigned to the assignee hereof.

A property of the bulk-effect device 21 of the drawing, and also of its alternate form, the Gunn oscillator, is that in a range of high electric field intensities, the material of sample 27 displays a negative differential resistance. This negative differential resistance causes the current or electron velocity in the material to decrease with increasing field. It is generally understood that in n-type gallium arsenide this characteristic results from the presence of two energy band minima, or valleys, in the material separated by a small energy gap; and carriers in the upper valley have less mobility than carriers in the lower valley. Any sample of material having these properties may be substituted for the gallium arsenide sample 27.

A typical sample 27 has a doping level of $5.6 \times 10^{15}$ carriers per cubic centimeter, has an area of 0.1 centimeter x 0.1 centimeter, and has a thickness of $2 \times 10^{-3}$ centimeters between contacts 28 and 29. The contacts 28 and 29 are symbolically metal discs with a hole at the center to allow the laser beam to propagate unimpeded. The resonant frequency of tank circuit 24 is 56 gigahertz and the voltage 22 and the load 23 are adjusted in accordance with the well known art of operating limited-space-charge-accumulation devices.

In the operation of the apparatus of the drawing, the tank circuit 24 controls the electric field distribution in the diode 11 so as to preclude the formation of any Gunn-type traveling high-electric-field region, or domains, while still deriving gain from the diode as required for self-sustained oscillation. The inhibition of Gunn-type domains is necessary to obtain an oscillating frequency of 56 gigahertz in a sample 27 having the designated length between contacts 28 and 29. If this distance were shortened to $2 \times 10^{-4}$ centimeters, a Gunn oscillator would produce 56 gigahertz and could be used. Nevertheless, the larger sample 27 of the drawing is preferred.

Even in the absence of Gunn-type high-electric-field regions, or domains, strong electric field waves having maxima and minima travel through the material at the oscillating frequency. We will refer to Gunn-type domains and to the latter waves generically as plasma waves.

Since gallium arsenide exhibits the electro-optic effect, the moving electric fields will cause time variations in the phases of the coherent radiations from the oscillating transitions of the laser. As a result, the different radiations will periodically transfer some energy into a wave at 56 gigahertz and, later, will receive energy back from that wave or from the similar waves fed by the other coherent radiations. This energy transfer process will produce the desired amplitude and phase-locking of the different coherent radiations of the carbon dioxide laser.

In the typical case, approximately ten to twenty rotational transitions of the laser are lasing. The number of these transitions determines the output pulse width, which in this case will be about $2 \times 10^{-12}$ seconds. Such a pulse is among the shortest presently obtainable in the laser art. The pulse repetition rate is equal to the oscillating frequency of the device 21, in this case about 56 gigahertz.

It may readily be seen that Gunn-type domains will produce equally effective electro-optic modulation of the different coherent laser radiations. Therefore, a Gunn oscillator of length above-mentioned will also produce the desired result. However, some optical energy will be lost by scattering or reflection from the moving domains.

Nevertheless, the limited-space-charge-accumulation device 21 of the drawing is more adjustable, by means of adjustable capacitor 25, than is the Gunn oscillator. Such adjustment may be desired in order to redistribute the strengths of the interactions among the various coherent radiations, inasmuch as some of their frequency spacings from the nearest frequencies of others may deviate by greater or lesser amounts from 56 gigahertz, the nominal frequency spacing of the different transitions.

What is claimed is:
1. Apparatus comprising:
 a laser including an optical resonator having an axis and a laser active medium that includes carbon dioxide disposed along said axis within said resonator, the optical resonator being adapted to promote simultaneous oscillation on a plurality of rotational transitions of carbon dioxide near 10.6 microns, adjacent ones of said transitions having a frequency difference of about 56 gigahertz, and
 a bulk-effect device disposed along said axis in said resonator, said device including:
 a sample of gallium arsenide,
 anodic and cathodic annular contacts on said sample in positions to encircle said axis of said resonator,
 bias-applying means for applying an electrical bias across said sample, comprising a source of direct-current voltage connected between said anodic and cathodic contacts to produce plasma wave oscillation in said device at a frequency near 56 gigahertz, and means connected with said contacts and said bias-applying means for tuning said frequency of oscillation near 56 gigahertz to said frequency difference of the frequencies of adjacent ones of said transitions oscillating in said resonator, whereby said transitions become amplitude-locked and phase-locked.

2. Apparatus according to claim 1 in which the tuning means includes a resonant tank circuit connected serially with said source of said direct-current voltage and said contacts, an element of said tank circuit being adjustable to provide the tuning.

References Cited
UNITED STATES PATENTS

| | | | |
|---|---|---|---|
| 3,377,566 | 4/1968 | Lanza | 331—107(G) |
| 3,412,251 | 11/1968 | Hargrove | 331—94.5X |
| 3,440,425 | 4/1969 | Hutson et al. | 250—199 |
| 3,475,078 | 10/1969 | Gordon | 350—160 |
| 3,353,896 | 11/1967 | Blattner | 350—160 |

OTHER REFERENCES

Patel: "Selective Excitation Through Vibrational Energy Transfer and Optical Maser Action in $N_2$-$CO_2$," Physical Review Letters, vol. 13, pp. 617–19, Nov. 23, 1964.

RONALD L. WIBERT, Primary Examiner

E. S. BAUER, Assistant Examiner

U.S. Cl. X.R.

331—107